June 25, 1929.  V. U. CLOER  1,718,332
PROCESS OF SELECTING COTTON SEED
Filed Dec. 24, 1926
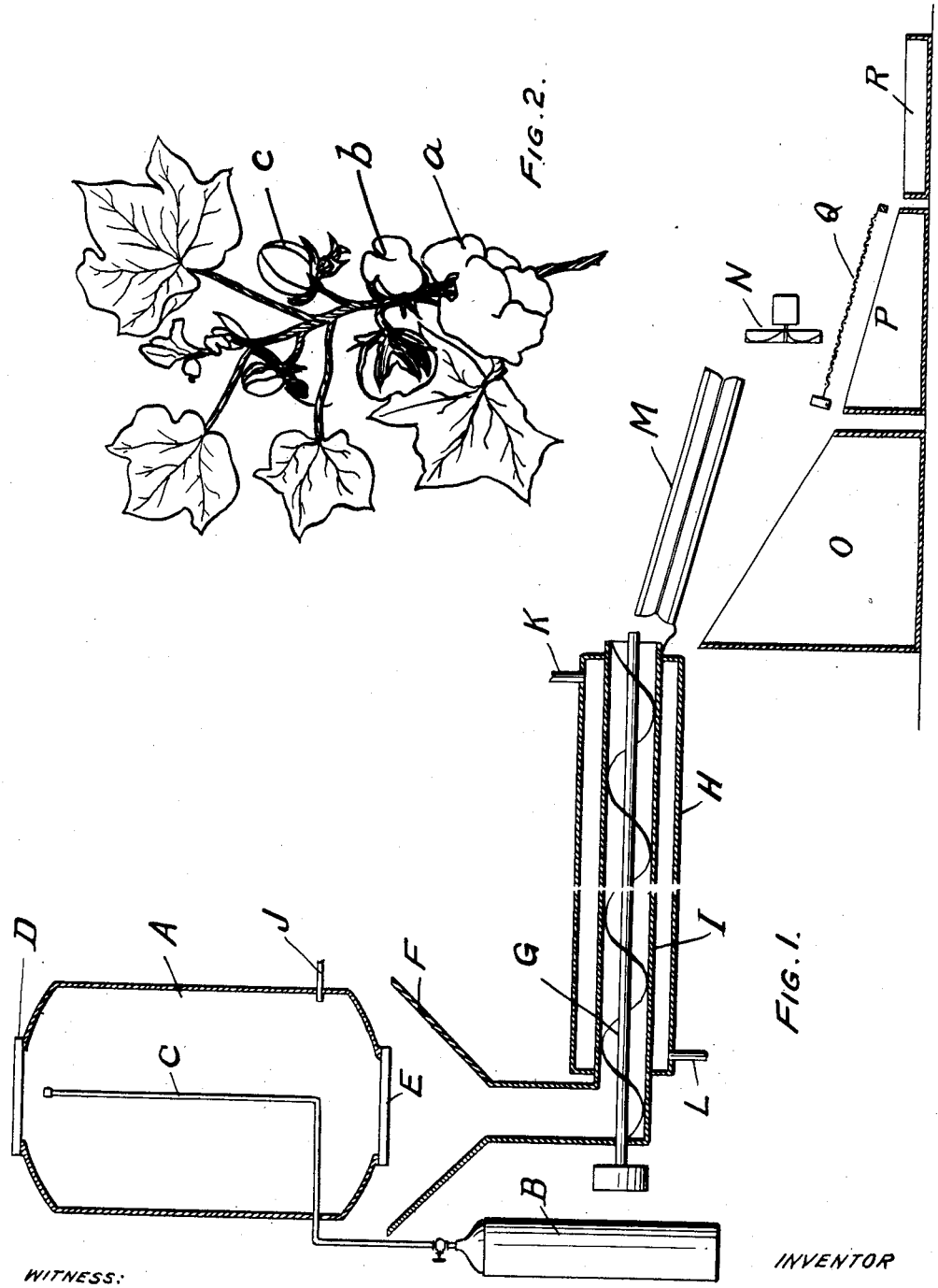
INVENTOR
Venus U. Cloer
BY
Busser & Harding
ATTORNEYS.
WITNESS:

Patented June 25, 1929.

1,718,332

UNITED STATES PATENT OFFICE.

VENUS U. CLOER, OF WICHITA FALLS, TEXAS.

PROCESS OF SELECTING COTTONSEED.

Application filed December 24, 1926. Serial No. 156,832.

Various methods are known of selecting cotton seed for the improvement and development of cotton, and for this purpose cotton breeding farms are established. The selection usually begins in the field at the time of cotton gathering. The large fine bolls are selected. Special care is taken in their ginning to avoid damage to the seed. The seed from selected bolls may be further separated, by hand or by machinery, to remove the light seeds. This process is tedious because of the small amount of lint left on the seed after ginning, which causes the seeds to adhere together, and the process is in consequence costly.

Although cotton breeding farms have been in operation for many years, there has been but little improvement in the cotton crop, with respect to size of boll, length of staple, or oil content of the seed. One of the reasons for this failure to substantially improve the crop is that the selected seed is so expensive that the average farmer cannot afford to use it in planting; or his outlay for such seed is not justified by the comparatively limited increase in yield of lint per acre over the ordinary seed.

The object of my invention is to provide a process whereby an ordinary grade of seed may be taken and made to yield seed that will grow a cotton crop as good as, or better than, the best seed from present cotton breeding farms and at less cost per acre.

My process, which is hereinafter particularly described, requires no particular mechanism to carry it out, but one of its advantages is that it adapts itself to being carried out by mechanism that may be largely or wholly automatic, thereby reducing labor cost to a minimum.

In Fig. 1 of the drawings is shown, in side elevation, and somewhat diagrammatically, an apparatus in which I have successfully practiced my process. Fig. 2 is a perspective view of a growing cotton stalk.

Referring, first, to Fig. 2: $a$ is a full open boll, $b$ a partially opened boll and $c$ a full grown boll before opening.

The boll $c$ is of ellipsoidal shape and contains the lint and seed of the cotton plant. This shape is maintained from its embryo until maturity and causes the seed at either end of the boll to grow to only small size and of irregular shape. As the boll begins to open, the seed at its upper end is first exposed to the atmosphere and, being soft as well as young at this early stage of development, they become, by reason of early exposure, light in weight and off color, and the germ of the seed becomes weakened. On the other hand, the center or heart seed, being protected, during the first stage of opening of the boll, by the upper end seeds, are not cramped during growth, and develop into seed that is mature, heavy, of good color and with a healthy germ.

After the boll has fully opened (as at $a$), it may remain in the field for a week or ten days before the farmer has time to pick it. During this period, the open boll catches water in the form of rain and dew. This moisture is held in the pod or burr, thus exposing the lower end seeds to a continual dampness that deteriorates their value as a planting seed. The center or heart seed do not suffer to the same degree by this exposure, and many of such seeds are ideal for planting.

As hereinbefore stated, it has been found impossible, or at least impracticable, in ginning, to separate the heart seed from the end seed due to their adhesion caused by the small amount of lint left on the seed during ginning. If the seed are ginned closer, the larger seeds are cracked and only the small end seeds are left in a condition to germinate and grow. The end seeds and lint are approximately 20 to 30 per cent of the total weight of the seed.

In planting the seed by present methods, they are placed in a hopper and removed therefrom by burr wheels, which claw them from hopper to drill. They can be successfully planted in no other manner because of the small amount of lint left on them, which causes them to cling together. This method of planting, however, requires from two to three times the required amount of seed that would be otherwise required.

The seed usually planted, regardless of type or grade, contain the end seed and lint. After germination of the seed and after the plants become a week or so old, the farmer must thin the plants so that they may have room to grow to their fullest extent. In this thinning, he cannot discriminate between plants from healthy heart seed and plants from unhealthy end seed. Hence the stand left is composed of plants grown from miscellaneous seed. It is because of this fact that there has been no great improvement in the United States cotton crop.

The preferred way of carrying out my process of selecting cotton seed involves the removal of the lint from the seed by first subjecting the seed to the action of a halogen acid gas and heat, preferably successively, whereby the lint loosens and becomes brittle due to its conversion into a cellulose acid product; then gently rubbing the seed together to cause the lint to separate therefrom and leaving smooth seed; and then sorting the light and heavy seed by screening or otherwise, the lint, or the lint and light seed, being blown from the heavy heart seed by means of air, leaving a selected heavy heart seed. The seed may be treated with ammonia gas to free it from acid, although this treatment is not usually necessary.

One of many apparati whereby my process may be practiced is shown in Fig. 1. Any apparatus that is used should be of a material, such as crockery, bakelite, or some non-corrosive metal, that will withstand the corrosive action of the acid gases.

The seed are placed in a container A through manhole D. Hydrochloric acid gas from a drum, or gas generator, B, is admitted to the container through a perforated pipe C until all the space within the container is filled with the acid gas and it escapes freely from the gas outlet J. The container is then closed tight, and a slight pressure, due to continual inflow of more acid gas, is built up in it. A pressure up to five pounds above atmospheric is preferred, but any pressure from zero to such high pressure as the container is capable of withstanding and that is not injurious to the seed, is operative. The seed should be held in contact with the gas at the stated superatmospheric pressure for from three to ten minutes, although no particular duration of such contact is required.

The gas is then released through exit J. The seed are dumped, through manhole E, into hopper F, whence they are fed, by means of a screw conveyor G, through an oven. This oven may comprise an inner pipe I, which contains the conveyor, and an outer pipe H, forming between them an annular chamber through which circulates a suitable heating medium, such as hot water or steam; K and L representing admission and exit pipes to the oven. The heating medium should hold the temperature of the conveyor between 180 and 210 degrees F., although a somewhat lower or a somewhat higher temperature is permissible. At this temperature, the screw conveyor should be of such length as to require from three to five minutes for the seed to travel through, although the time of exposure to heat may be varied above or below these limits, especially if the preferred temperature range specified should not be adhered to. Heating may be dispensed with if the seed are exposed to a dry atmosphere for a prolonged time, but the process is thereby unduly prolonged.

The seed, treated as described, are delivered between felt-covered boards M, which are manipulated to subject the seed to a rubbing action, which causes the brittle, loosely adhering lint to fall from the seed. This special rubbing action is not indispensable if, in the other operations to which the seed are subjected, the lint is effectively separated from the seed. Tumbling or agitation may act effectively.

The seed from the rubbing device fall in front of fan N, which blows the lint and light seed into a receptacle O and allows only the clean heavy seed to be deposited on the screen Q. The screen, which should be gently rocked or reciprocated, is of such mesh that relatively small seed pass through it into a receptacle P, leaving the large, heavy, healthy heat seed on top of the screen, this selected seed being delivered to a receptacle R.

The hydrochloric acid gas converts the lint into a cellulose hydrochloride, which, as hereinbefore stated, is brittle and is easily rubbed from the seed, and then easily separated therefrom by blowing with air, as described. The air current may be strong enough to remove light seed as well as this cellulose product, or it may be just strong enough to remove mainly the cellulose product, leaving the removal of most of the light seed to the screen. As many screens may be used as may be desired. The number will depend on the fineness of grading desired.

In case the seed may contain more than the usual amount of moisture, such moisture may absorb and retain some of the acid, which may not evaporate in the oven. It is then desirable, in order to preserve the seed, to neutralize the acid by treating it with ammonia gas or other effective neutralizing base.

It should be understood that the invention is not limited to the use of hydrochloric acid gas for the purpose of loosening the bond between the seed and the lint. Any other substance that will have this effect to the required degree may be substituted. Thus, other halogens have been found equally effective, for example, hydrobromic acid gas (which converts the lint to cellulose hydrobromide) and hydroiodic acid gas (which converts the lint to cellulose hydroiodide). All halogen acid gases are especially effective.

Seed produced and selected by the foregoing process are smooth and do not cling together and show a germinating test of from 98 to 100 per cent. Because of the smooth condition of the seed, they may be dropped one by one by the planter; and because of their germination tests, they may be so planted at intervals corresponding to the desired distance between plants. Therefore, a bushel of my selected seed will plant from four to seven times the number of acres that can be planted with a bushel of ordinary cotton seed.

It will thus be seen that while, by affording an inexpensive method of separating selected seed, the improvement of the cotton crop is my main object and will perhaps constitute the most important and valuable result of my invention, the feature of more immediate practical value is that the reasonable expense of separating and preparing the seed from planting is more than balanced by the increase in planting power, which brings my improved seed within the purchasing power of any cotton planter, who will be insured of a better and finer yield of cotton than hitherto without incurring the expense involved in the purchase of seed which, although expensively selected, is believed to be of a quality certainly not superior, and probably inferior, to that produced by my process and much inferior to that produced by my process so far as concerns its adaptability to economical and convenient distribution in planting.

My process is also of value in that the seed selected thereby may be used for expressing a high grade edible cotton seed oil.

Having now fully described my invention, what I claim and desire to protect by Letters Patent is:

The process of preparing cotton seed for planting which comprises subjecting a mass of seed in dry condition within an enclosed space to the action of a halogen acid gas under superatmospheric pressure, removing the seed from the acid atmosphere, heating the seed to a temperature of about 180° F. to 210° F., then agitating the seed to remove the lint.

In testimony of which invention, I have hereunto set my hand, at Wichita Falls, Texas, on this 18th day of December, 1926.

VENUS U. CLOER.